Nov. 15, 1932.     H. M. ROCKWELL     1,887,787
INTERNAL COMBUSTION ENGINE
Original Filed Oct. 7, 1925    2 Sheets-Sheet 1

INVENTOR
HUGH M ROCKWELL
BY
Lewis O. Hutchinson
ATTORNEY

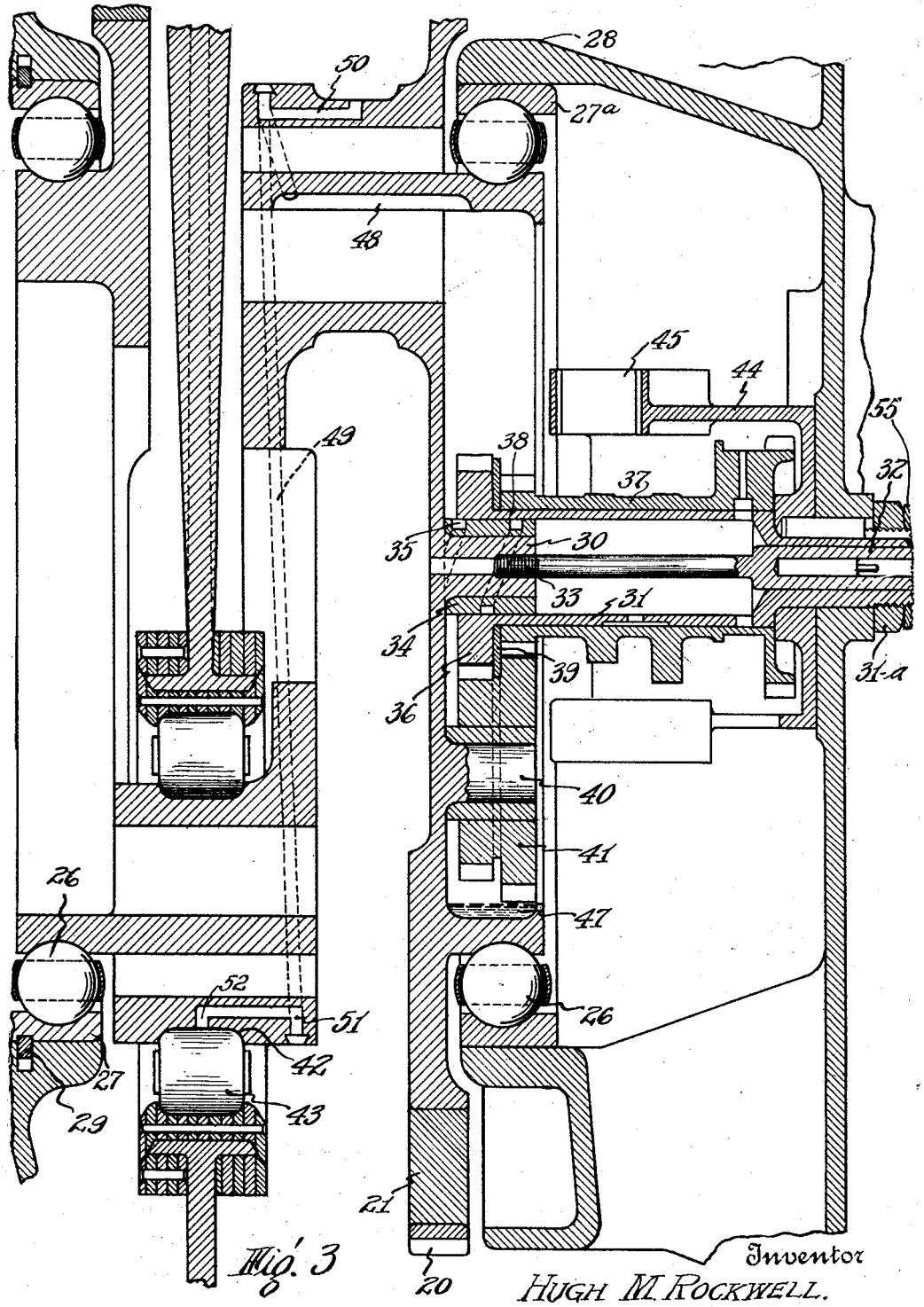

Patented Nov. 15, 1932

1,887,787

UNITED STATES PATENT OFFICE

HUGH M. ROCKWELL, OF FREEPORT, NEW YORK

INTERNAL COMBUSTION ENGINE

Refile of application Serial No. 61,076, filed October 7, 1925. This application filed May 31, 1930.
Serial No. 458,755.

This invention relates to internal combustion engines and has for its object a compact light weight balanced crank shaft.

According to the invention, the crank shaft comprises a plurality of cheeks connected by one or more crank pins to each of which is attached one or more pitmen depending upon the number of cylinders. Each end cheek of the crank shaft is provided with a groove to receive anti-friction members, the diameter of the bearing surface of the groove being greater than the throw of the crank shaft. The crank shaft is supported by means of anti-friction members interposed between the grooves in the cheeks and grooves in race members mounted in the crank case. A counter weight is attached to each end plate opposite the crank pin. This arrangement allows the length and weight of the crank shaft to be reduced to a minimum and also reduces the possibility of vibration in the shaft when rotating.

One cheek is grooved to act as an oil reservoir and from it oil ducts lead to the crank pins by means of which the cylinders and pistons are lubricated.

Referring now to the drawings, Fig. 1 is a plan view of a crank shaft embodying the invention.

Fig. 3 is an enlarged sectional view of the crank shaft showing its relation to other parts of the engine.

Figure 1:
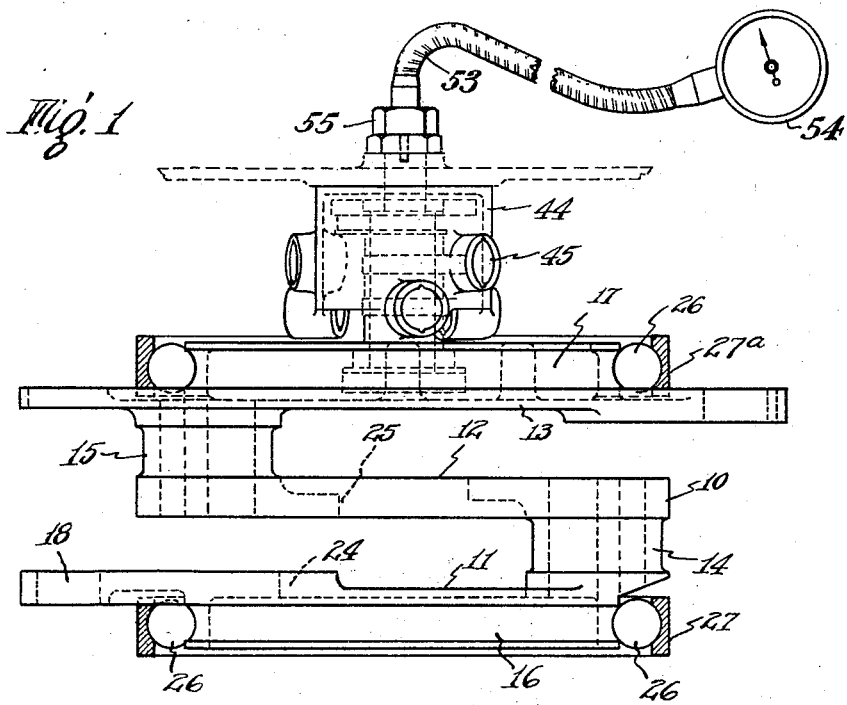
Figure 2:
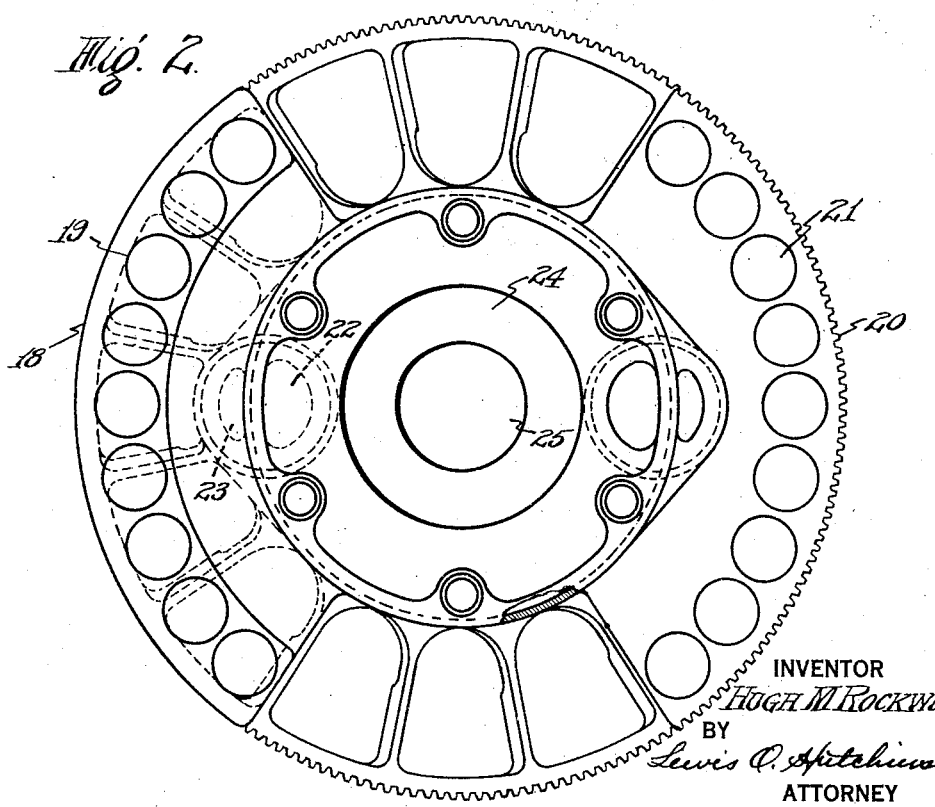
Fig. 2 is an end view.

The crank shaft 10, which is disclosed in this application as a double throw shaft, consists of three cheeks 11, 12 and 13 which are connected by the crank pins 14 and 15. The cheek 11 is provided with a groove 16 to receive anti-friction bearings, the diameter of the bearing surface of the groove being greater than the throw of the crank shaft. A similar groove 17 is provided in the cheek 13. The cheek 11 has an extension opposite the crank pin 14 to form a sector 18 in which are mounted metal slugs 19 or the like to act as a counter balance. The cheek 13 is extended to form a disc which is provided on its periphery with teeth 20 adapted to mesh with the pinion of a starting motor (not shown). Slugs 21 are mounted in the disc 13 opposite the crank pin 15 to act as a counter-balance. The number of slugs on the metal used may be chosen so as to give the desired weight, thereby permitting variation. Apertures 22 and 23 extending through the plates 11 and 13 are provided in the crank pins to decrease the weight thereof and apertures 24 and 25 are provided in the cheeks 11 and 12 for the same purpose. The faces of the cheeks 11 and 13 are recessed to reduce further the weight of the crank shaft.

The crank shaft is supported by means of anti-friction members 26 interposed between the grooves 16 and 17 and grooves in race members 27 and 27a which are supported in collars 28 projecting from the ends of the crank case of the engine. The race member 27 is held in place by means of a snap ring 29 which fits in cooperating grooves in the race member 27 and its supporting collar.

A stud 30 projects from the center of cheek 13 into a hollow shaft 31 having a reduced portion extending through an aperture in the wall of the crank case. A nut 31a is threaded onto the reduced portion to clamp the shaft to the wall of the crank case. The open end of shaft 31 is closed by a plug 32 rotatably mounted therein and having a portion 33 threaded into the stud 30. Encircling the shaft 30 is a bushing 34 in which is cut an oil groove 35.

Integral with the shaft 31 is a gear 36 and mounted on the shaft is a cam sleeve 37 having a gear 38 integral therewith. Between the gear 36 and the gear 38 is interposed a steel washer 39 mounted on the shaft 31.

A second stud 40 projects from the cheek 13 at a point opposite the crank pin 15. On this shaft is mounted a double pinion 41 having different diameter gears forming a part of a planetary gearing for driving the cam sleeve 37. The pinion 41 has one set of teeth meshing with the gear 36 and the other set in mesh with gear 38. Between the two sets of teeth is a groove into which projects the washer 39 to maintain the double pinion in proper relation to the gears 36 and 38. The stud 40 and pinion 41 assist in counter-balancing the weight of the crank pin 15. In each crank pin is provided a groove 42 to receive anti-friction members 43 which serve to mount one or more connecting rods on each crank pin.

The reduced portion of shaft 31 also passes through an aperture in the bottom of and serves as a support for a cup-shaped member 44 which surrounds the cam sleeve 37. Tubular members 45 project from its wall to act as guides for tappet rods (not shown) engaging the cam sleeve 37.

The wall of the recess in the face of the plate 13 is grooved to form an oil reservoir 47. From this reservoir a duct 48 extends through the crank pin 15 to a duct 49 in the cheek 12. Ducts 50 and 51 lead from the duct 49 to the bearing grooves 42 on the crank pins.

Oil is forced in the interior of the shaft 31 through apertures 52 by a pump (not shown). From here it flows through the spiral groove 35 in the bushing 34 from the end of which it flows onto the double pinion 41 and then finds its way into the oil well 47. It then feeds along the duct 48 to the duct 49, from which it is distributed to the crank pin bearings through the ducts 50 and 51. An even distribution of oil to the connecting rod bearings is thus obtained as the duct 49 acts as a reservoir from which the oil flows out in equal amounts to the bearings through the leads 50 and 51.

In the end of the plug 32 is provided a recess shaped to receive the end of the drive shaft 53 of a tachometer 54 which is held in place by a nut 55 screwed onto the threaded portion of the shaft 31. The plug 32 rotates with the crank shaft and drives the tachometer shaft 53. This application is a re-file of application, Serial No. 61,076, filed October 7, 1925.

It is, of course, understood that various structural modifications may be made without departing from the spirit of the invention as set forth in the appended claims.

I claim:

1. In an internal combustion engine, a crank case, a crank shaft having bearing surfaces of a diameter at least as great as the throw of the crank pin, a shaft mounted on said crank casing, a sleeve rotatably mounted on said shaft, a gear formed on the end of said shaft, a gear formed on said sleeve, a stud shaft projecting from said crank shaft, a double pinion mounted on said stud shaft, said pinion having one set of teeth in mesh with each of said gears.

2. In an internal combustion engine, a crank case, a crank shaft having bearing surfaces of a diameter at least as great as the throw of the crank pin, a shaft mounted on said crank casing, a sleeve rotatably mounted on said shaft, a gear formed on the end of said shaft, a gear formed on said sleeve, a stud shaft projecting from said crank shaft, a double pinion mounted on said stud shaft, said pinion having one set of teeth in mesh with each of said gears, and a steel washer interposed between said gears and the two sets of teeth on said double pinion properly to position said double pinion relative to said gears.

3. In an internal combustion engine, a crank case, a crank shaft having bearing surfaces of a diameter at least as great as the throw of the crank pin, a shaft mounted on said crank casing, a sleeve rotatably mounted on said shaft, a gear formed on the end of said shaft, a gear formed on said sleeve, a stud shaft projecting from said crank shaft, a double pinion mounted on said stud shaft, said pinion having one set of teeth in mesh with each of said gears, said stud shaft being positioned opposite the crank pin partly to counter-balance the weight of said crank pin.

4. In an internal combustion engine, a crank shaft, a hollow member, a stud on said crank shaft projecting into said hollow member, a sleeve rotatably mounted on said member, gears integral with said member and said sleeve, a double pinion rotatably mounted on said crank shaft, said pinion having a groove between the sets of teeth, and a washer mounted on said member between said gears, said washer projecting into said groove to position said double pinion in mesh with said gears.

5. In an internal combustion engine, a crank case, a crank shaft having crank pins and bearing members of a diameter at least as great as the throw of the crank pins, a hollow cylinder supported by said crank case, a gear formed on one end of said cylinder, a sleeve rotatably mounted on said cylinder, a gear formed on said sleeve, a stud shaft projecting from said crank shaft, a double pinion mounted on said shaft, said pinion having one set of teeth in mesh with each of said gears, an axial projection from said crank shaft extending into said cylinder and having an oil groove, one of said bearing members having an internal groove adapted to receive oil from said first groove and said crank shaft having a duct leading from said second groove to the periphery of the crank pins.

6. In an internal combustion engine, a crank case, a crank shaft having crank pins and bearing members of a diameter at least as great as the throw of the crank pins, a hollow cylinder supported by said crank case, and an axial projection from said crank shaft extending into said cylinder and having an oil groove, one of said bearing members having an internal groove adapted to receive oil from said first groove and said crank shaft having a duct leading from said second groove to the periphery of the crank pins.

7. In combination, a shaft, a pair of gears mounted on said shaft in definite relation, a rotatable member coaxial with said shaft, a counter shaft carried by said rotatable member, a double pinion on said counter shaft having one set of teeth in mesh with one of said gears and the other set of teeth in mesh with the other gear, and a washer interposed between said gears, said washer fitting in a groove in said pinion properly to position said pinion relative to said gears.

In testimony whereof, I have signed my name to this specification.

HUGH M. ROCKWELL.